2,757,158
Patented July 31, 1956

2,757,158
POLYESTER RESIN COMPOSITIONS

Joseph R. Darby and August R. Hempel, Webster Groves, Mo., assignors to Monsanto Chemical Company, St. Louis, Mo., a corporation of Delaware No Drawing. Application April 22, 1954,
Serial No. 425,042

8 Claims. (Cl. 260—31.8)

This invention relates to improvements in polyester resin compositions.

The reaction of vinyl aromatic compounds with unsaturated polyester resins obtained from a 1,2-dihydroxy alkane such as ethylene glycol and $\alpha,\beta$-unsaturated dicarboxylic acids has long been known to provide copolymers which while tough suffer from lack of flexibility.

It is an object of this invention to provide relatively tough flexible copolymers of vinyl aromatic compounds with unsaturated polyester resins obtained from a 1,2-dihydroxy alkane and $\alpha,\beta$-unsaturated dicarboxylic acids which copolymers are further characterized by excellent light stability.

This and other objects are attained by dissolving a benzyl phthalate of the formula

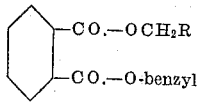

where R is an alkyl radical or a carbalkoxy (i. e., —CO.—O-alkyl) radical in an unsaturated polyester resin in admixture with a vinyl aromatic compound copolymerizable with said resin and heat curing the solution so obtained in the presence of a free radical initiator for polymerization, such as for example the organic peroxides.

The new and improved polyester resin compositions have been found to be highly useful in coating or impregnating various materials such as textiles, paper, and the like. They may be admixed with fillers, pigments, dyes, and other conventional ingredients. A particularly valuable application is their use in treating paper or cloth of food containers.

The unsaturated polyester resins of this invention are made by condensing about 50 chemical equivalents of a dihydroxy alkane of the structure

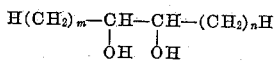

where $m$ and $n$ are integers from 0 to 2, inclusive, with substantially 50 chemical equivalents of a mixture of an aromatic dicarboxylic acid (or its anhydride) and an $\alpha$-,$\beta$-ethylenically unsaturated dicarboxylic acid particularly those of the structure

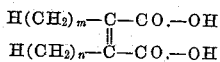

(or their anhydrides) where $m$ and $n$ are integers from 0 to 2, inclusive, in which the latter constitutes 15 to 35 of the acid equivalents.

The dihydroxy alkanes to be used are ethylene glycol, propylene glycol, 2,3-butylene glycol, 2,3-amylene glycol, and the like.

The $\alpha,\beta$-ethylenically unsaturated dicarboxylic acids of the mixture of dicarboxylic acids which may be used in preparing the unsaturated polyester resins of this invention are maleic acid, fumaric acid, citraconic acid, mesaconic acid, dimethyl maleic acid, methylethyl maleic acid, diethyl maleic acid, and the like. Of this group of acids maleic and fumaric are particularly preferred. The aromatic dicarboxylic acid of the mixture of dicarboxylic acids employed in preparing the unsaturated polyester resins of this invention is phthalic acid (or its anhydride). However, it may be replaced in whole or in part by other aromatic dicarboxylic acids (or their anhydrides) such as isophthalic acid, terephthalic acid, the various mono-, di-, tri- and tetrachlorphthalic acids, and the like.

The dihydroxyalkane and dicarboxylic acid components of the unsaturated polyester resin are admixed and reacted in accordance with conventional practice at elevated temperatures until an acid number of 2 to 100 is obtained. The reaction condensation product is then cooled to room temperature and serves as the base resin of this invention.

In order to obtain the improved polyester resin composition of this invention a benzyl phthalate ester such as Ethyl benzyl phthalate
Propyl benzyl phthalate
n-Butyl benzyl phthalate
Isobutyl benzyl phthalate
Isoamyl benzyl phthalate
Octyl benzyl phthalate
(2-ethyl)hexyl benzyl phthalate
Benzyl phthalyl ethyl glycolate
Benzyl phthalyl isopropyl glycolate
Benzyl phthalyl n-butyl glycolate
Benzyl phthalyl isobutyl glycolate and the like, must be dissolved in the mixture or solution of unsaturated polyester resin and vinyl aromatic compound prior to the copolymerization step. Ordinarily amounts of the benzyl phthalate ester in the range of 15 to 50 parts per 100 parts by weight of the unsaturated polyester resin will be used, however amounts above or below may be used where desired. The benzyl phthalate ester may be added before or after the vinyl aromatic compound is admixed with the unsaturated polyester resin.

In the preferred embodiment of the invention the vinyl aromatic compound is styrene. Examples of other vinyl aromatic compounds which may be used are the nuclearly substituted styrenes such as those containing lower alkyl substituents, e. g. meta-ethyl styrene, propyl styrene, ethyl methyl styrene; those containing chlorine substituents, e. g. ortho chloro styrene, 1,2-dichloro styrene, 2,4-dichloro styrene, 3,4-dichloro styrene; and those containing lower alkyl-oxy substituents, e. g. para-methoxy styrene and para-ethoxy styrene; as well as vinyl biphenyl vinyl naphthalene, and the like. The amount of vinyl aromatic compound to be used in preparing the improved polyester resin compositions may be varied between 10 and 100 parts per 100 parts by weight of the unsaturated polyester resin base, however amounts in the range of 20 to 50 parts per 100 parts unsaturated polyester resin are preferred. The amount used for optimum conditions will depend somewhat upon the polymerization rate, solubility and volatility of the particular vinyl aromatic compound.

In order to accelerate the polymerization reaction polymerization catalysts such as the organic peroxides are preferred, for example benzoyl peroxide, succinic peroxide, lauroyl peroxide, stearoyl peroxide, cocoanut oil acid peroxides, tert. butyl hydroperoxide, the terpene oxides such as ascaridole, and like free radical initiators. Usually only small amounts of the polymerization catalyst are used, e. g. a catalytic amount in the range from about 0.05 to about 3% based upon the weight of the unsaturated polyester resin-vinyl aromatic compound mixture.

As illustrative of the new polyester resin compositions and the preparation of same is the following:

Example I

An unsaturated polyester base resin is prepared by heating the following charge at 160–205° C. until the acid number of the resin is about 20–25.

| | Mols |
|---|---|
| Fumaric acid | 0.8 |
| Ethylene glycol | [1] 2.4 |
| Phthalic anhydride | 1.2 |

[1] 20% mol excess.

At the end of the condensation reaction, the reaction mixture is cooled. The product is a viscous liquid unsaturated polyester resin.

To five 100 parts by weight portions of the polyester base resin is added respectively, 33 parts by weight of styrene. To the respective solutions so obtained is added respectively 15, 20, 25, 37.5 and 50 parts by weight of butyl benzyl phthalate. To the respective solutions so obtained is added 1.5 parts by weight of benzoyl peroxide and the respective mixtures agitated to obtain homogeneity. The respective mixtures are then cast into a sheet, heated for 10 minutes at 127° C., cooled to room temperature and allowed to stand until each mixture completely hardens and is easily removable. The respective cast sheets are colorless, hard, tough and resilient.

Employing the same procedure as above but omitting butyl benzyl phthalate the cast sheet obtained while hard and tough is very brittle.

Example II

An unsaturated polyester base resin is prepared by heating the following charge at 200° C. until the acid number of the resin is about 35.

| | Mols |
|---|---|
| Maleic anhydride | 1.0 |
| Ethylene glycol | [1] 2.4 |
| Phthalic anhydride | 1.0 |

[1] 20% mol excess.

At the end of the condensation reaction, the reaction mixture is cooled. The product is a viscous liquid unsaturated polyester resin.

To three 100 parts by weight portions of the polyester base resin is added 37.5 parts by weight of styrene. To the respective solutions so obtained is added and dissolved, respectively, 20, 25 and 35 parts by weight of butyl benzyl phthalate. To the respective solutions so obtained is added 0.8 part by weight of lauroyl peroxide and the respective mixtures agitated to obtain homogeneity. The respective mixtures are then cast into a sheet and then heated for 10 minutes at 127° C. The respective systems are cooled at room temperature and allowed to stand until each mixture completely hardens and is easily removable. The respective cast sheets are hard, tough and resilient.

Employing the same procedure as above but omitting butyl benzyl phthalate the cast sheet obtained while hard and tough is very brittle.

Example III

An unsaturated polyester base resin is prepared by heating the following charge at 200° C. until the acid number of the resin is about 35.

| | Mols |
|---|---|
| Maleic anhydride | 1.0 |
| Propylene glycol | [1] 2.4 |
| Phthalic anhydride | 1.0 |

[1] 20% mol excess.

At the end of the condensation reaction, the reaction mixture is cooled. The product is a viscous liquid unsaturated polyester resin.

To three 100 parts by weight portions of the polyester base resin is added 50 parts by weight of styrene. To the respective solutions so obtained is added and dissolved, respectively, 20, 25 and 35 parts by weight of butyl benzyl phthalate. To the respective solutions so obtained is added 0.8 part by weight of lauroyl peroxide and the respective mixtures agitated to obtain homogeneity. The respective mixtures are then cast into a sheet and then heated for 10 minutes at 127° C. The respective systems are cooled at room temperature and allowed to stand until each mixture completely hardens and is easily removable. The respective cast sheets are hard, tough and resilient.

Employing the same procedure as above but omitting butyl benzyl phthalate the cast sheet obtained while hard and tough is very brittle.

The polymerizable compositions of this invention may be polymerized at a wide variety of temperatures. Thus polymerization may be carried out at room temperatures, particularly when substantial amounts of catalysts are present. Generally, where possible, it is desirable to employ higher temperatures in order to shorten the time required for polymerization, e. g. temperatures between 50° C. and 200° C. In curing thin films it is frequently desirable to carry out the operation in the presence of an inert atmosphere.

It is to be understood that the description of this invention set forth hereinbefore is illustrative thereof and that variations and modifications obvious to those skilled in the art may be made without departing from the spirit or scope of this invention.

What is claimed is:

1. The process which comprises mixing 100 parts by weight of an unsaturated polyester resin, 10 to 100 parts by weight of a vinyl aromatic compound copolymerizable with said resin, and 15 to 50 parts by weight of a benzyl phthalate of the structure

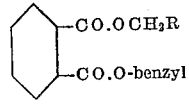

where R is selected from the group consisting of alkyl radicals and carbalkoxy radicals, admixing with the homogeneous solution so obtained a catalytic amount of a free radical initiator for polymerization, and thereafter curing the mixture, the said unsaturated polyester resin being obtained by condensing substantially 50 chemical equivalents of a dihydroxy alkane of the structure

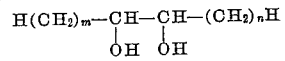

where $m$ and $n$ are integers from 0 to 2, inclusive, with 15 to 35 chemical equivalents of an $\alpha,\beta$-unsaturated dicarboxylic acid and 35 to 15 chemical equivalents of a phenyl dicarboxylic acid.

2. The process which comprises mixing 100 parts by weight of an unsaturated polyester resin, 20 to 50 parts by weight of styrene, and 15 to 50 parts by weight of butyl benzyl phthalate, admixing the homogeneous solution so obtained with a catalytic amount of an organic peroxide, and thereafter heat curing the mixture, the said unsaturated polyester resin being obtained by condensing substantially 50 chemical equivalents of ethylene glycol with 15 to 35 chemical equivalents of maleic acid and 35 to 15 chemical equivalents of phthalic acid.

3. The process which comprises mixing 100 parts by weight of an unsaturated polyester resin, 20 to 50 parts by weight of styrene, and 15 to 50 parts by weight of butyl benzyl phthalate, admixing the homogeneous solution so obtained with a catalytic amount of an organic peroxide, and thereafter heat curing the mixture, the said unsaturated polyester resin being obtained by condensing substantially 50 chemical equivalents of ethylene glycol with 15 to 35 chemical equivalents of fumaric acid and 35 to 15 chemical equivalents of phthalic acid.

4. The process which comprises mixing 100 parts by weight of an unsaturated polyester resin, 20 to 50 parts by weight of styrene, and 15 to 50 parts by weight of butyl benzyl phthalate, admixing the homogeneous solution so obtained with a catalytic amount of an organic peroxide, and thereafter heat curing the mixture, the said unsaturated polyester resin being obtained by condensing substantially 50 chemical equivalents of propylene glycol with 15 to 35 chemical equivalents of maleic acid and 35 to 15 chemical equivalents of phthalic acid.

5. The product obtained by the process of claim 1.
6. The product obtained by the process of claim 2.
7. The product obtained by the process of claim 3.
8. The product obtained by the process of claim 4.

References Cited in the file of this patent

UNITED STATES PATENTS

| | | |
|---|---|---|
| 2,015,077 | Lawson | Sept. 24, 1935 |
| 2,255,313 | Ellis | Sept. 9, 1941 |
| 2,361,019 | Gerhart | Oct. 24, 1944 |
| 2,423,042 | Muskat | June 24, 1947 |
| 2,467,526 | Harris | Apr. 19, 1949 |